United States Patent [19]
Firth

[11] 3,819,052
[45] June 25, 1974

[54] FLUID FILTER

[75] Inventor: Robert L. Firth, Minneapolis, Minn.

[73] Assignee: Donaldson Company, Inc., Minneapolis, Minn.

[22] Filed: Sept. 15, 1972

[21] Appl. No.: 289,646

[52] U.S. Cl.................... 210/90, 55/309, 210/91, 210/131, 210/172, 210/446, 210/456
[51] Int. Cl............................................ B01d 27/10
[58] Field of Search......... 210/85, 90, 95, 130, 131, 210/132, 91, 446, 456, 172

[56] References Cited
UNITED STATES PATENTS

| | | | |
|---|---|---|---|
| 2,287,344 | 6/1942 | Easton et al. | 210/131 |
| 2,348,651 | 5/1944 | Schelly | 210/91 |
| 3,214,023 | 10/1965 | Donner | 210/172 |
| 3,323,649 | 6/1967 | Rosaen | 210/91 X |
| 3,368,680 | 2/1968 | Bozek | 210/91 X |
| 3,487,930 | 1/1970 | Rosaen | 210/172 X |
| 3,591,002 | 7/1971 | Rosaen | 210/456 X |

Primary Examiner—Samih N. Zaharna
Assistant Examiner—Robert G. Mukai
Attorney, Agent, or Firm—Merchant, Gould, Smith & Edell

[57] ABSTRACT

A first cylindrical filter housing having an open top is at least partially surrounded by a second housing forming a passageway therebetween. A baffle with a central opening is mounted in the open top and a cylindrical filter element is yieldably biased against the baffle member in the first housing. A dome-shaped cover is attached on top of the second housing to provide a flow path for fluid flowing from the passageway to the central opening in the baffle member into the filter element for passage through the filter element and then through an opening in the second housing. A combination bypass-indicator member is attached to the top of the movable filter element for guided sliding movements in the central opening of the baffle member.

14 Claims, 6 Drawing Figures

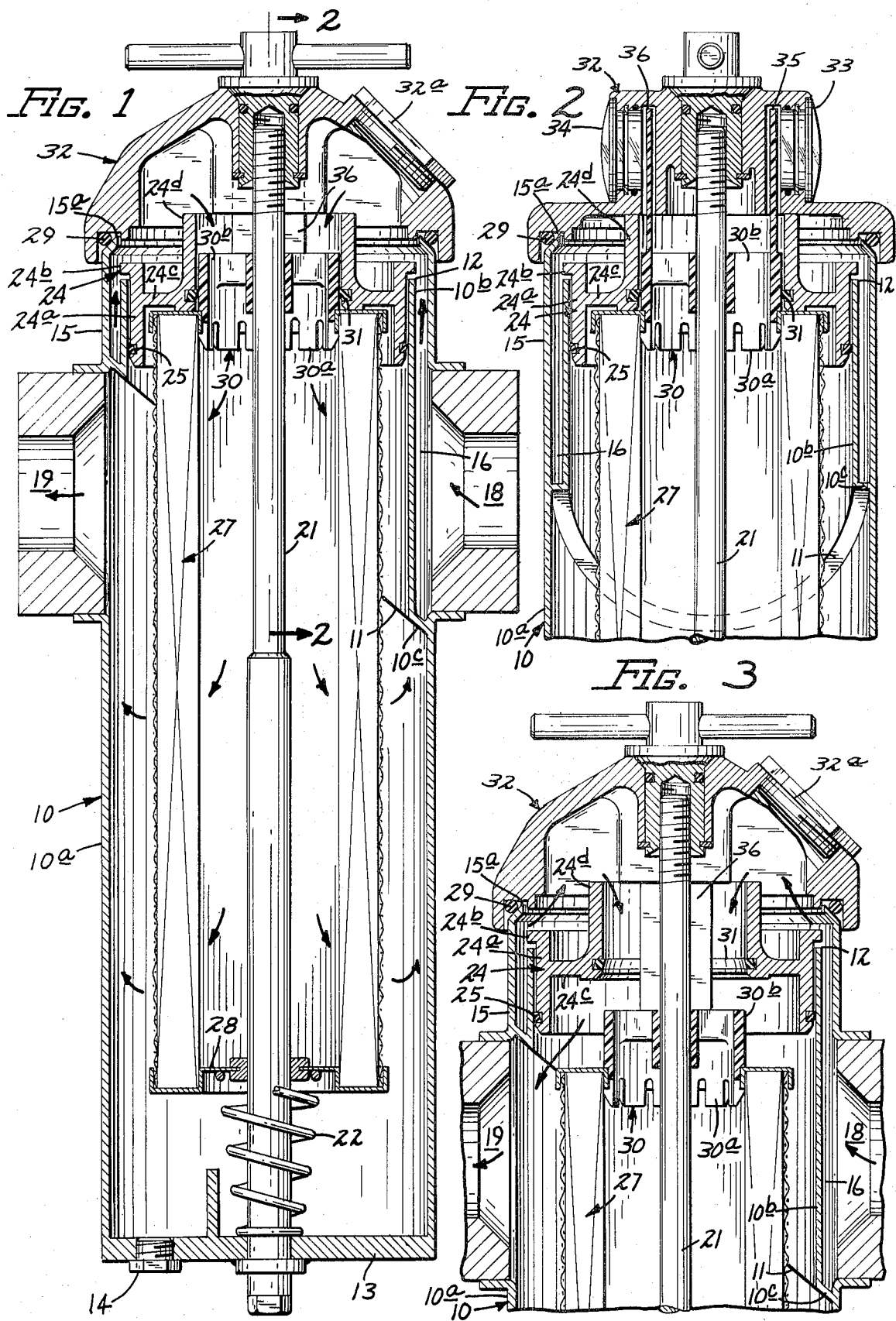

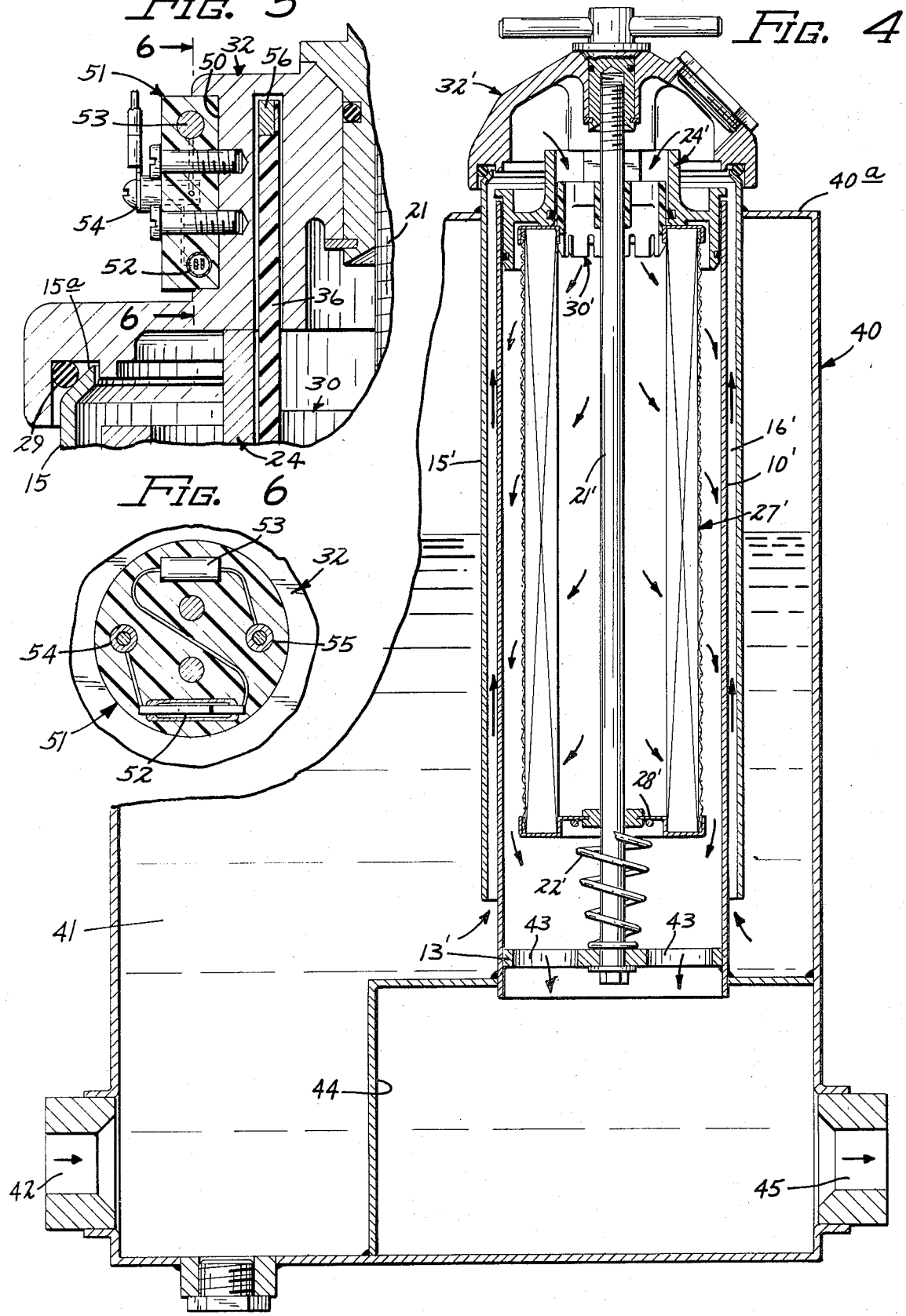

FLUID FILTER

BACKGROUND OF THE INVENTION

1. Field of the Invention

This invention relates generally to fluid filter devices and more particularly relates to an oil filter having an unique double wall construction, bypass means with visual indication thereof, and a construction whereby removing the top cover permits access to only those areas containing unfiltered oil.

2. Description of the Prior Art

Because of their extensive use for many years, the basic principles of oil filtration are well known. The prior art has recognized the desirability of providing bypass means to permit oil to pass around the filter element when it becomes clogged. In connection with this feature, various indicator devices have been designed to provide visual indication of a bypass condition. In other prior art systems, the designers have been concerned with isolating the previously filtered material from the oil being bypassed and also designing the filter so that the filter element can be changed without introducing foreign materials into the clean oil areas of the filter. As an example, the U.S. Rosaen Pat. No. 3,239,062, issued Mar. 8, 1966, discloses an oil filter assembly purporting to have many of these features. One drawback of the structure shown in the Rosaen patent is that it is not easily adapted to a wide variety of installations. When mounted as shown in FIG. 1 of the Rosaen patent, removal of the cover permits loss of oil from the housing. Further, the indicator extends through the housing, providing an additional sealing problem and exposing the indicator mechanism to damage. These and other disadvantages of the particular filter assembly shown in the Rosaen patent will be more fully recognized after the structure and operation of the present invention are clearly understood. Basically, I have found that the art is so highly developed that almost any individual feature thought to be desirable can be found in some prior art system. However, it is extremely difficult to design a filter assembly that will compatibly include a wide variety of these desirable features.

SUMMARY OF THE INVENTION

The present invention provides an oil filter assembly having a double wall that is designed to act as a conduit for the fluid to flow into the housing over the top edge of the interior wall. A dome-like cover mounted on the outer housing serves to guide the fluid downwardly into the interior housing where a cylindrical filter element is located. The fluid flows through the filter element from inside to outside into the interior housing from which it flows through a suitable outlet opening. A baffle mounted between the filter element and the inner housing isolates the clean oil areas of the assembly when the cover is removed so that the new oil can be added only to the areas containing unfiltered oil. Therefore, the clean oil side of the filter is isolated from the dirty oil side even when the cover is removed. Another feature of the present invention is that the filter element is spring-biased against the baffle member so that it can move away from the baffle member if clogged to permit fluid to bypass the filter. Because the material clogging the filter element is inside the filter element, the fluid is allowed to bypass the element without washing off the materials previously filtered from the oil. A tubular bypass member attached to the top end of the filter element extends through and is guided by an opening in the baffle member. The bypass member is also provided with upstanding tabs which are seen through suitable windows in the cover to provide an indication of bypass or no bypass condition. The bypass indicator tabs are located completely within the housing so that no sealing problems are present and so that they are not exposed to physical damage. If desired, magnets can be attached to the movable indicator tabs which will activate switches outside the housing to in turn provide some form of electrical indication. Another important feature of the present invention is that oil cannot drain from the system when the cover is removed. These and other features of the present invention will be more fully described in the following specification.

BRIEF DESCRIPTION OF THE DRAWINGS

FIG. 1 is an axial sectional view of a preferred embodiment of the oil filter of the present invention;

FIG. 2 is a fragmentary sectional view taken along line 2—2 of FIG. 1;

FIG. 3 is a fragmentary view similar to the view of FIG. 1, with the filter element and bypass member shown under bypass conditions;

FIG. 4 is an axial sectional view of an alternate embodiment of the fluid filter mounted in an oil reservoir;

FIG. 5 is an enlarged fragmentary sectional view similar to FIG. 2, showing an alternate form of bypass indicator including a magnet and switch operated thereby; and FIG. 6 is a fragmentary sectional view taken along line 6—6 of FIG. 5.

DESCRIPTION OF THE PREFERRED EMBODIMENTS

Referring now to the drawings, wherein like reference numerals are used throughout the several views to indicate like elements of the invention, there is disclosed in FIG. 1 an oil filter having a first generally cylindrical inner filter housing or wall 10 including a lower portion 10a and a reduced diameter upper portion 10b. The upper and lower portions 10a and 10b are joined along a plane 11 intersecting the housing 10 at an angle of approximately 45° as viewed in FIG. 1. Housing 10 has an open top end terminating in a circular edge 12 lying in a horizontal plane. The bottom end of housing 10 is closed off by means of a bottom end member 13 having a drain plug 14 secured in an opening therein. Surrounding the upper portion 10b of first housing 10 is a second housing or outer wall 15 having the same diameter as lower portion 10a, to thereby provide a continuous diameter outer housing for the oil filter. Second housing 15 is generally cylindrical and terminates in an upper edge 15a which is circular and lies in a horizontal plane positioned above the plane of edge 12. Second housing 15 defines an annular passageway 16 which is located between upper portion 10b and second housing 15. Passageway 16 is closed along plane 11 by means of an outwardly extending flange 10c. The annular space between upper edges 12 and 15a is open. A fluid inlet opening 18 is provided in outer housing 15 directly across from an outlet opening 19 in first housing 10.

A rod 21 is secured at its bottom end to bottom end member 13 and extends upwardly coaxially with housing 10. Rod 21 has a threaded top end portion which extends above the top of the two housings. A coil spring 22 is mounted around rod 21 adjacent bottom end 13. Mounted in the top end of inner housing 10 is a baffle member 24. Baffle member 24 includes a generally cylindrical outer portion 24a which fits coaxially within the top end 10b of housing 10. The outer portion 24a of the baffle has a horizontally outwardly extending upper flange 24b which is positioned above edge 12 to limit the downward movement of the baffle. Mounted between the cylindrical outer portion 24a of the baffle and the upper portion 10b of the housing is an O-ring type flexible seal member 25 to prevent fluid flow therebetween.

Extending horizontally inwardly from outer portion 24a is a web portion 24c of the baffle, which carries on its outer periphery a cylindrical guide portion 24d. Guide portion 24d is again coaxial with rod 21. Guide portion 24d also defines an axial opening surrounding rod 21.

A cylindrical pleated filter element 27 is mounted in the filter chamber of housing 10, around rod 21, coaxially therewith, between spring 22 and baffle 24. The top end of the filter element 27 engages the lower end of guide portion 24d of the baffle. The bottom end of the filter element 27 is provided with a disk-like closure member 28 secured thereto with an axial opening thereof slidably mounted on rod 21. The bottom side of closure member 28 engages the top end of spring 22. Thus, filter element 27 is yieldingly biased upwardly against baffle 24.

A tubular bypass member 30 has a lower end portion 30a thereof extending into and engaging the upper open end of the filter element 27. An upper end portion 30b thereof slidably extends into the axial opening of the baffle member 24. A flexible O-ring type seal 31 is positioned between bypass member 30 and guide portion 24d to prevent fluid flow therebetween.

A dome-like cover member 32 is secured by threaded engagement with the top end of rod 21 to the top edge 15a of the second housing. A fluid-tight O-ring seal 29 is positioned between the cover 32 and the inwardly turned upper edge of the second housing 15. Cover 32 has a partially open interior which provides a fluid flow path between passageway 16 and the axial opening through guide member 24d and bypass member 30. Thus, fluid entering inlet opening 18 passes through passageway 16 into the interior of dome-shaped cover 32 and then downwardly through the axial opening in bypass member 30 to the interior of filter element 27. The fluid then passes through filter element 27 into the annular chamber between element 27 and housing 10a and then flows outwardly through outlet opening 19.

As best shown in FIG. 2, cover 32 is provided with oppositely disposed viewing windows 33 and 34. Extending upwardly from bypass member 30 are a pair of oppositely disposed tabs 35 and 36 which are normally positioned behind windows 33 and 34. Under normal fluid flow conditions, the two tabs 35 and 36 observation, positioned behind the windows 33 and 34 for visual observation to indicate a normal filter condition.

If the filter element 27 should become clogged with foreign material, the pressure inside the filter element will increase, and will act against the bottom closure member 28 causing it to move downwardly against spring 22, carrying filter element 27 therewith. Filter element 27 moves downwardly carrying bypass member 30 therewith, as shown in FIG. 3. When the upper edge of bypass member 30 passes below the guide portion 24d, oil is permitted to flow therebetween directly from the axial opening in guide portion 24d to the outlet 19. Thus, under bypass conditions, the filter element is entirely outside the flow path. For this reason, material collected on the inside of the filter is not disturbed or carried away by the bypass flow. In the bypass condition, as shown in FIG. 3, the two upwardly extending tabs 35 and 36 are carried downwardly below the level of the two windows 33 and 34 so that they are no longer visible through the windows. The tabs can be painted a different color than the portion of the cover behind the tabs so as to indicate clearly the change in condition.

The filter apparatus of FIGS. 1–3 has a number of important advantages. The double housing arrangement as shown in FIG. 1 maximizes the outlet area between the filter element 27 and the outlet 19, where the greatest outlet flow occurs, while utilizing to good advantage the oppositely disposed area where the filter element is less effective. In other words, the inlet passageway 16 on the right-hand side of FIG. 1 occupies an area of relatively low outlet flow. This effectively reduces the size of the package without really adversely affecting flow through the filter.

Another important advantage of the present invention is that the baffle member 24 isolates the clean oil side of the filter from the dirty oil side when the cover 32 is removed. Thus, when cover 32 is removed, the operator has direct access only to the passageway 16 and to the axial opening, both of which contain unfiltered or dirty oil. Thus, if oil is added through the open top end, it will be filtered before it is used. The relationship of the various elements also prevents draindown of the system when the cover is removed. The upper portion 10b of the inner housing extends above the level of the inlet opening 18 and thus acts as a barrier to oil flow therefrom. The inner housing upper portion 10b and the baffle 24 acts as a barrier to flow between the inlet opening 18 and the outlet opening 19. Fluid can be added to the system and the element serviced without loss of fluid in the filter housing or encountering draindown of fluid from the system. When the filter is used in the pressure location (i.e., inlet opening 18 receiving fluid under pressure from the pump) or in a return line with the inlet opening 18 receiving fluid from a hydraulic system, the fluid locked in passageway 16 prevents air from entering the plumbing and prevents fluid from draining from the system.

When the outlet port 19 is connected to the suction line of a pump, the unit is then usually located between the pump and a reservoir so as to break the syphon between the pump and the reservoir when air is admitted into the head cavity through a bleed valve or when the cover is removed. This permits servicing of the filter or the pump without completely draining the reservoir and permits refilling the pump and suction lines through the filter.

Fluid can also be added to the system through a charging port 32a in the cover 32. If the charging port is located above the reservoir level, oil can simply be added through the charging port. However, if the filter assembly is located below the fluid level in the reservoir, a check valve may be added to the charging port 32a to prevent draindown during the filling operation.

To service the filter, it is evident that cover 32 is simply unscrewed from the threaded top end of rod 21 and baffle member 24 pulled out of the top end of housing 10. After baffle member 24 is removed, bypass member 30 and filter element 27 can be pulled upwardly out of the housing 10. Filter element 27 can then be cleaned or replaced as necessary.

In FIG. 4, there is disclosed another embodiment of the invention. The structure is basically the same except that the outer housing or wall 15' is generally cylindrical and extends coaxially with the inner housing or wall 15' to a point near the bottom end thereof. An annular oil inlet opening is thus provided at the bottom end of annular passageway 16' between the bottom end of outer housing 15' and the inner housing 10'. The entire unit is mounted in an oil reservoir 40 having a top wall 40a with an opening therein. The filter apparatus extends into the oil reservoir through the opening in the top wall 40a. The second housing 15' is sealed in the opening by means of a periphery weld or the like. Reservoir 40 contains a supply of return or dirty oil 41 which is pumped into the reservoir through an opening 42. The dirty oil 41 thus enters the annular chamber or passageway 16' and flows upwardly into the cover 32' and from there downwardly into the interior of the filter element 27' as previously described.

The clean oil, after passing through the filter element 27' is discharged into the inner housing 10' from where it passes downwardly through openings 43 in the bottom end member 13'. The bottom end of inner housing 10' is secured in an opening extending into a separate clean oil chamber 44. The clean oil leaves the chamber 44 through an outlet opening 45. This double wall design makes it possible to install a filter in a reservoir 40 without cumbersome plumbing within the reservoir 40 and permits convenient servicing of the filter by removing the cover 32' from outside the reservoir 40. The double wall acts as a conduit for the fluid to flow from the outside through the cover into the element. The construction is such that variation in the relative lengths of the housings with selective porting allows optimum installation conditions relative to the shape of the reservoir and the location of the system ports therein.

The design of FIG. 4 again minimizes the need to remove oil from the system for servicing. For example, if the cover 32' is removed, no oil can escape from the system since the oil levels are below the top edges of the housings. Oil can be added to the return oil supply 41 by pouring it into the annular opening at the top of passageway 16'. Oil can be added to the clean oil supply by pouring it into the interior of the filter element. If it is necessary to service the element, the cover 32', the baffle 24', the bypass member 30' and the filter element 27' can all be removed without removing any oil from the system and without contaminating the clean oil supply. When the filter assembly is installed in the suction line, the pump (which is downstream from outlet opening 45) and plumbing is full of clean oil. If it is should be necessary to remove the pump for servicing, the only oil that must be drained is that within the chamber 44 and inner housing 10'. The oil in the outer reservoir 40 is isolated by the upstanding inner housing 10'. After the pump has been replaced or repaired, the inner housing 10' can again be filled through the axial opening in the baffle 24' to thereby replace all air in the lines with the clean oil.

The basic structure of the present invention can be utilized in a wide variety of installations, without changing the important structural features thereof. The drawings illustrate only two examples of how the double wall construction can be utilized to provide a more compact filter assembly and to permit simple attachment to reservoirs without cumbersome plumbing.

In FIG. 5, there is disclosed an alternate form of bypass indicator. The structure of FIG. 2 has been modified by eliminating the window 34 in front of the tab 36. Instead of drilling an opening through the cover 32 so that the tab 36 can be visually monitored through window 34, a blind opening 50 is drilled in the cover in the same position as window 34. As indicator assembly 51 is mounted in the opening 50 by means of a pair of screws as shown in FIG. 5. In the preferred embodiment of the invention, indicator assembly 51 is a cylindrical block molded from a suitable plastic material, having molded directly therein a switching circuit. The switching circuit includes a reed switch 52 connected in series with a resistor 53 between a pair of electrical contacts 54 and 55, which are accessible to the exterior of indicator assembly 51 as shown in FIG. 5.

Mounted on the top end of tab 36 is a magnet 56 which moves therewith under bypass conditions. Under normal operating conditions, as shown in FIG. 5, the magnet 56 is displaced a considerable distance from reed switch 52 so that switch 52 remains normally open. Under bypass conditions, when tab 36 moves downwardly, magnet 56 becomes aligned with reed switch 52, causing it to close. Electrical contacts 54 and 55 are connected in series with a battery and a signal light, which becomes energized upon the closing of switch 52. A buzzer or other type of signal device could also be connected in series in the circuit.

Electrical switches have also been used in prior art fluid filters. However, these switches have required either mechanical actuation or actuation by a pressure switch. In either case, some physical connection had to be made from inside the filter housing to the externally mounted switch. This required close machining, accurate adjustments, good sealing and protection from various physical abuses encountered in service. The sensor described above is mounted on the exterior of the housing with no connections to the interior of the assembly. The electrical components are cast in a non-conductive material into a solid block to render the switch resistant to physical abuses encountered in service.

If desired, the fluid filter can be built with only a single electrical indicator included therein. Alternatively, the opposite side of the cover can be provided with a viewing window of the type previously described. This would provide both electrical and visual indication. Another alternative is to provide a clear window through the indicator assembly 51 and mount the indicator assembly 51 in an opening similar to the opening shown in FIG. 2. It would also be possible to mount the magnets directly on the movable filter element and mount the sensing device on the exterior of the housing 10.

What is claimed is:
1. Fluid filter apparatus, comprising:

a. an inner generally cylindrical wall having a open top end and a bottom end, defining a filter chamber;

b. an outer wall, having an open top end, at least partially surrounding said inner wall to form a passageway therebetween;

c. a rod carried by said bottom end extending axially through said filter chamber;

d. a spring on said rod adjacent said bottom end;

e. a cylindrical filter element mounted coaxially on said rod above said spring and having an open top end and a bottom end, spring engaging closure means secured to the bottom end of the filter element and having an axial opening therein whereby the filter element and the closure means are slidably mounted on said rod;

f. a baffle member, having an axial opening, mounted in said open top end of said inner wall and engaging said top end of said filter element to act as a barrier to direct fluid flow between said passageway and the portion of the chamber surrounding said filter element;

g. a tubular bypass member having a lower end portion thereof engaging said open top end of said filter element, and an upper end portion thereof slidably extending into said axial opening of said baffle member and having means associated with said bypass member to maintain the bypass member and upper end of the filter element coaxial with respect to the rod during a bypass condition;

h. a cover member mounted on said open top end of said outer wall and shaped to provide a fluid flow path between said passageway and said tubular bypass member;

i. fluid inlet means in said outer wall and fluid outlet means in said inner wall, said top end of said inner wall extending above the level of said inlet means in said outer wall; and j. said filter element and bypass member being movable on said rod downwardly against said spring to permit fluid to bypass between said baffle member and the top end of said filter element upon said movement of said filter element and bypass member.

2. The apparatus of claim 1 wherein said outer wall is generally cylindrical and surrounds said inner wall, and wherein said open top end of said outer wall extends above said top end of said inner wall to provide an annular passageway leading to the interior of said cover member, said cover member being generally dome-shaped.

3. The apparatus of claim 2 wherein said bottom end of said inner wall has fluid outlet openings therein and is connected to a clean fluid reservoir, and wherein a return fluid reservoir is provided around said outer wall to supply fluid to an inlet opening at the bottom of said passageway.

4. The apparatus of claim 1 wherein said outer wall is generally cylindrical and surrounds said inner wall to define an annular inlet opening at the bottom of said passageway.

5. The apparatus of claim 4 in combination with an enclosed return oil reservoir having a top wall with an opening therein, said filter apparatus extending into said oil reservoir through said opening with said outer wall being sealed to said top wall of said reservoir around the periphery thereof, and a separate clean oil chamber mounted around the bottom end of the inner wall, said bottom end of the inner wall having outlet openings therein.

6. The apparatus of claim 1 wherein said inner wall comprises a lower portion having a first diameter and an upper portion having a reduced diameter, and wherein said outer wall surrounds said upper portion of said inner wall and has a diameter equal to said first diameter to thereby provide a continuous diameter outer housing.

7. The apparatus of claim 6 wherein said upper and lower portions of said inner wall are joined along a plane intersecting said housing at an angle other than normal with respect to said rod.

8. The apparatus of claim 1 wherein said cover is generally dome-shaped and is threadedly engaged to the top end of said rod, wherein a viewing window is mounted in said cover, and wherein a tab is mounted on said bypass member which extends upwardly behind said window to permit visual observation thereof, said tab moving downwardly with said bypass member to indicate a bypass condition.

9. The apparatus of claim 1 wherein said baffle member has a generally cylindrical outer portion which fits within and coaxial with said inner wall, a web portion extending horizontally inwardly therefrom and a cylindrical guide portion connected to said web portion to slidably engage and guide said tubular bypass member extending therein.

10. The apparatus of claim 9 wherein flexible seal members are mounted between said outer cylindrical portion of said baffle member and said inner wall, and between said cylindrical guide portion and said bypass member to prevent fluid flow therebetween.

11. The apparatus of claim 1 wherein a magnet is mounted on one of said movable members to move therewith during a bypass condition, and wherein switch means are secured to the exterior of said filter apparatus which are responsive to the movement of said magnet.

12. The apparatus of claim 11 wherein said magnet is mounted on said bypass member and said switch means is mounted to the exterior of said cover member.

13. The apparatus of claim 1 wherein said cover member is generally dome-shaped, wherein a tab is mounted on said bypass member which extends upwardly into said cover member, said tab moving downwardly with said bypass member during a bypass condition, and wherein means are provided on said cover member to indicate said movement.

14. The apparatus of claim 13 wherein a magnet is mounted on said tab and wherein an electrical indicator assembly is mounted on said cover member, said indicator assembly including a switch which opens and closes in response to movements of said magnet.

* * * * *